3,198,857
METHOD OF TREATING A MOLD FOR CONCRETE WITH A BOND RELEASE COATING MATERIAL
Robert W. Childers, Midvale, N.J., and Richard K. Snow, St. Petersburg, Fla., assignors to Raymond International Inc., New York, N.Y., a corporation of New Jersey
Filed May 8, 1962, Ser. No. 193,180
12 Claims. (Cl. 264—32)

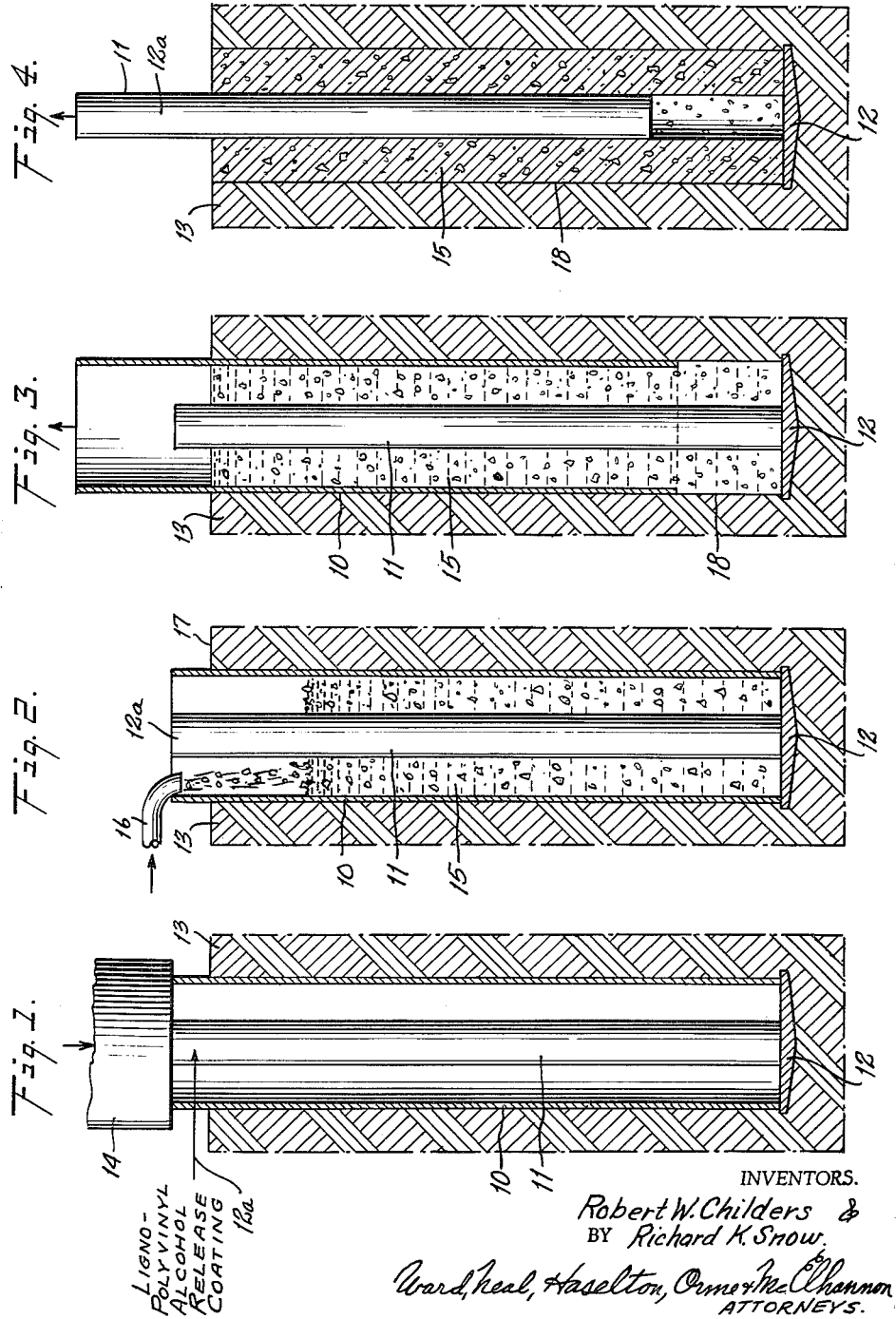

This invention pertains to the treatment of concrete molding forms of wood, plastic, metal or other suitable material, and particularly metal molding forms which are designed for repeated reuse in the production of cast-in-place concrete shapes, and has for its object the elimination or minimization or adherence between the molding form and the concrete after the latter has set to permit removal of the form.

The invention has for its objects the provision of a novel coating composition and method of treating such forms, for achieving substantial freedom from adherence of the molding shape to the concrete on setting, with resultant smoothness and freedom from flaws of the finished concrete shape and with no impairment chemically or structurally of the concrete surface.

When liquid concrete is poured within, about or against a molding form for imparting a desired shape, considerable difficulty is encountered in removing the mold form after the concrete has set, due to sticking or adherence of the solidified concrete to the mold surface engaging the same. In an effort to eliminate this difficulty, it has heretofore been proposed to precoat the mold surface against which the concrete is cast, with various coating compositions such as mineral oils of various types and viscosities, water-in-oil emulsions and other oleagenous substances immiscible with water; also with various metal or organic salts of both inorganic and organic acids, and various complex organic compounds or complexes, none of which, however, has effectively solved this problem.

What might be termed the "acid test" as to the effectiveness of a release coating composition for purposes aforesaid, is encountered in the formation in the ground of cast-in-place tubular concrete pile shells. Such shells are conventionally placed by driving into the ground to a desired depth of penetration, a tubular metal casing assembled on a boot plate or driving point. After the driving is complete or prior thereto if desired, a closed cylindrical metal form or mandrel of substantially smaller diameter than the casing is concentrically inserted therein until it rests upon the boot plate, and the annular space between the casing and mandrel filled with liquid concrete. The outer casing is then withdrawn before the concrete has set so that no serious problems of adherence of the concrete to the casing are encountered. The mandrel, however, cannot be withdrawn until the concrete has solidified sufficiently to retain its shape, and hence tends strongly to adhere to the mandrel throughout its surface area, requiring tremendous pulling forces for withdrawal of the mandrel. Release coating compositions as heretofore proposed, including those above mentioned, have proved of little value in reducing this adherence.

We have, however, evolved a release coating composition which has proved highly effective for such and related applications, and such that adherence between the solidified concrete shell and the mandrel is substantially nil, permitting the mandrel to be easily withdrawn, and leaving the shell interior with a smooth surface, free from flaws and unchanged as to the ultimate chemical or physical structure as compared to the concrete in the remainder of the shell.

The release coating composition of our invention comprisee the reaction product in boiling water of polyvinyl alcohol (PVA) and the lignitic waste from sulphite paper manufacture. This lignitic waste is essentially sulphonated lignin or more specifically a calcium-ligno-sulphonated complex. A suitable grade of polyvinyl alcohol is that marketed by the Colton Chemical Co. Division of Air Reduction Company, Cleveland, Ohio, as its grade 125, having a viscosity of 24–28 centipoises, a hydrolysis of 99.85% plus, a pH of 5.5–7.5, with volatiles of 5% maximum and ash of 2% maximum.

The preferred proportions of the make-up are about 10 grams by weight each of the PVA and lignin complex to 100 grams of water, although these proportions do not appear to be critical, as proportions of 5–20 grams of the PVA and 5–50 grams of the lignin complex, per 100 grams of water have been found effective.

The procedure for making the coating composition of the invention is to heat the water to boiling and then add the PVA which apparently goes into solution or into extremely finely comminuted suspension. After solution or suspension of the PVA is complete, the lignin complex is added which also appears to go into solution or finely dispersed suspension. Applicants have been unable to determine whether or not a true chemical reaction is here involved.

In the coating composition as thus produced, the lignin complex appears to act as a retarder which slows up the cure of the concrete at the mold-concrete interface, thereby to prevent a bond between the concrete and the mold. A satisfactory film coating cannot, however, be obtained with this constituent alone in aqueous medium. Hence it was found necessary to incorporate therewith a suitable film forming carrier to dissolve or suspend the retarder in order to distribute the retarder in concrete, for which purpose the PVA proved highly effective as the film forming agent.

The release coating composition produced as above may be applied to the metal, wood, plastic or other mold surfaces by brushing, spraying or rolling techniques. The exact action of the so-coated material is not completely understood. Observations have established, however, that essentially what happens is that a continuous dry film is obtained on the mold surface which becomes soft, elastic and slick upon contact with the wet concrete. This film then acts as a lubricating and separating layer between the concrete and mold and permits a ready separation. The film separates from both mold and concrete and either is brought to the surface along with the mandrel as applied to the production of a cast-in-place concrete shell or, alternatively, falls to the bottom of the hole in the concrete.

There does, however, appear to be a reaction between the coating material and the concrete. This reaction creates a water insoluble, continuous film which is soft, elastic and slick to the touch. These characteristics then allow the film to act as a lubricating layer between the concrete and metal.

The invention resides in the selection and combination of the two ingredients for the coating material. Neither the retarder or film former will provide a satisfactory separation by itself. Together they provide complementary functions and accomplish the desired releasing action.

By way of illustrating the invention as applied to the placement in the ground of a cast-in-place concrete shell, reference will now be had to the annexed drawing wherein:

FIGURE 1 is a view in axial sectional elevation of a pile driving assembly being driven into the ground, and comprising an outer tubular casing, a centrally disposed mandrel, disposed on a boot plate together with a driving head, the mandrel having been precoated with the release coating composition of the invention. FIGURE 2 is a similar view after completion of the driving with the driving head removed and showing the filling of the annular space between the mandrel and the casing with liquid concrete. FIGURE 3 is a similar view but showing the casing in the process of being withdrawn while the concrete remains liquid. FIGURE 4 is a similar view but with the casing fully withdrawn and after the concrete has hardened and set, and showing the withdrawal of the centrally disposed mandrel.

Referring to FIG. 1, the outer tubular steel casing 10 and centrally disposed mandrel 11 of substantially smaller diameter, are mounted on a boat plate or driving point 12, and the assembly driven into the ground 13 by means of a driving head 14 surmounting the casing. The mandrel, as stated, has been precoated with the aforesaid ligno-polyvinyl alcohol coating composition of the invention, as indicated at 12a. Referring to FIG. 2, upon completion of the driving, the driving head 14 is withdrawn, and the annular space between the casing 10 and mandrel 11 is filled with liquid concrete, as at 15, supplied thereto from a grout line 16 extending to the top of the casing as shown. Referring to FIG. 3, after the annular space between the casing 10 and mandrel 11 has been filled with liquid concrete 15 substantially to the ground line 17 as shown, the casing 10 is withdrawn, allowing the liquid concrete to flow against the surrounding earth 13 as at 18. Referring to FIG. 4, after the tubular concrete shell 15 has hardened and set, the mandrel 11 is withdrawn as shown, to leave in the ground 13 the now fully hardened and cast-in-place concrete shell resting on the boot plate 12. As above explained, the release coating composition 12a permits of easy withdrawal of the mandrel without appreciable adherence to the hardened concrete shell.

What is claimed is:

1. The method of molding a concrete surface to a desired shape by means of a mold form having a surface for imparting said shape, which comprises: precoating said surface with a coating composition comprising as an essential active ingredient the reaction product in boiling water of polyvinyl alcohol and the lignitic waste material from the sulphite paper process, casting liquid concrete against the so-coated mold surface, allowing the concrete to harden and set, and withdrawing the mold form.

2. The method of molding a concrete surface to a desired shape by means of a mold form having a surface for imparting said shape, which comprises: precoating said surface with a coating composition comprising as an essential active ingredient the reaction product in boiling water of polyvinyl alcohol and sulphonated lignin, casting liquid concrete against the so-coated mold surface, allowing the concrete to harden and set, and removing the mold.

3. The method of molding a concrete surface to a desired shape by means of a mold having a surface for imparting said shape, which comprises: precoating said mold surface with a coating composition comprising as an essential active ingredient the reaction product in boiling water of polyvinyl alcohol and calcium-ligno-sulphonate, casting liquid concrete against the so-coated surface, allowing the concrete to harden and set, and thereupon removing said mold form.

4. The method of forming a tubular concrete shell in the earth, which comprises: forming a hole in the earth extending to a desired depth of penetration, precoating a mandrel of substantially smaller sectional dimensions than said hole, with a coating composition comprising as an essential active ingredient the reaction product in boiling water of polyvinyl alcohol and the lignitic waste material from the sulphite paper process, so disposing said mandrel within said hole as to provide an annular space between the earth and mandrel, filling said annular space with liquid concrete, allowing the concrete to harden and set, and thereupon withdrawing the mandrel.

5. The method of forming a tubular concrete shell in the earth, which comprises: forming a hole in the earth extending to a desired depth of penetration, precoating a mandrel of substantially smaller sectional dimensions than said hole, with a coating composition comprising as an essential active ingredient the reaction product in boiling water of polyvinyl alcohol and sulphonated lignin, so disposing said mandrel within said hole as to provide an annular space between the earth and mandrel, filling said annular space with liquid concrete, allowing the concrete to harden and set, and thereupon withdrawing the mandrel.

6. The method of forming a tubular concrete shell in the earth, which comprises: forming a hole in the earth extending to a desired depth of penetration, precoating a mandrel of substantially smaller sectional dimensions than said hole, with a coating composition comprising as an essential active ingredient the reaction product in boiling water of polyvinyl alcohol and calcium-ligno-sulphonate, so disposing said mandrel within said hole as to provide an annular space between the earth and mandrel, filling said annular space with liquid concrete, allowing the concrete to harden and set, and thereupon withdrawing the mandrel.

7. The method of molding a concrete surface to a desired shape by means of a mold form having a surface for imparting said shape, which comprises: precoating said surface with a coating composition comprising as an essential active ingredient the reaction product in boiling water of polyvinyl alcohol and the lignitic waste material from the sulphite paper process, in the proportions of 5–20 grams of said alcohol and 5–50 grams of said lignitic waste per 100 grams of water, casting liquid concrete against said mold surface, allowing the concrete to harden and set, and withdrawing the mold form.

8. The method of molding a concrete surface to a desired shape by means of a mold form having a surface for imparting said shape, which comprises: precoating said surface with a coating composition comprising as an essential active ingredient the reaction product in boiling water of polyvinyl alcohol and sulphonated lignin, in the proportions of 5–20 grams of said alcohol and 5–50 grams of said sulphonated lignin per 100 grams of water, casting liquid concrete against said mold surface, allowing the concrete to harden and set, and removing the mold.

9. The method of molding a concrete surface to a desired shape by means of a mold having a surface for imparting said shape, which comprises: precoating said mold surface with a coating composition comprising as an essential active ingredient the reaction product in boiling water of polyvinyl alcohol and calcium-ligno-sulphoante, in the proportions of 5–20 grams of said alcohol and 5–50 grams of said calcium-ligno-sulphonate per 100 grams of water, casting liquid concrete against said surface, allowing the concrete to harden and set, and thereupon removing said mold form.

10. The method of forming a tubular concrete shell in the earth, which comprises: forming a hole in the earth extending to a desired depth of penetration, precoating a metal mandrel of substantially smaller sectional dimensions than said hole, with a coating composition comprising as an essential active ingredient the reaction product in boiling water of polyvinyl alcohol and the lignitic waste material from the sulphite paper process, in the proportions of 5–20 grams of said alcohol and 5–50 grams of said lignitic waste per 100 grams of water, so disposing said mandrel within said hole as to provide an annular space between the earth and mandrel, filling said annular space with liquid concrete, allowing the concrete to harden and set, and thereupon withdrawing the mandrel.

11. The method of forming a tubular concrete shell in the earth, which comprises: forming a hole in the earth extending to a desired depth of penetration, precoating a metal mandrel of substantially smaller sectional dimensions than said hole, with a coating composition comprising as an essential active ingredient the reaction product in boiling water of polyvinyl alcohol and sulphonated lignin, in the proportions of 5–20 grams of said alcohol and 5–50 grams of said sulphonated lignin per 100 grams of water, so disposing said mandrel within said hole as to provide an annular space between the earth and mandrel, filling said annular space with liquid concrete, allowing the concrete to harden and set, and thereupon withdrawing the mandrel.

12. The method of forming a tubular concrete shell in the earth, which comprises: forming a hole in the earth extending to a desired depth of penetration, precoating a metal mandrel of substantially smaller sectional dimensions than said hole, with a coating composition comprising as an essential active ingredient the reaction product in boiling water, of polyvinyl alcohol and calcium-lignosulphonate, in the proportions of 5–20 grams of said alcohol and 5–50 grams of said calcium-ligno-sulphonate per 100 grams of water, so disposing said mandrel within said hole as to provide an annular space between the earth and mandrel, filling said annular space with liquid concrete, allowing the concrete to harden and set, and thereupon withdrawing the mandrel.

References Cited by the Examiner
UNITED STATES PATENTS

| | | | |
|---|---|---|---|
| 1,811,610 | 6/31 | Carlile | 106—38.23 XR |
| 2,251,824 | 8/41 | Edwards | 264—33 XR |
| 2,579,481 | 12/51 | Fenn | 260—17.5 |
| 2,783,522 | 3/57 | Ripley | 25—155 |
| 2,971,239 | 2/61 | Sahaici | 25—155 |
| 3,053,779 | 9/62 | O'Neill | 260—17.5 |
| 3,077,647 | 2/63 | Kugler. | |
| 3,090,204 | 5/63 | Upson | 61—53.66 |
| 3,115,414 | 12/63 | Lottridge | 106—38.23 |

OTHER REFERENCES

Condensed Chemical Dictionary, 6th edition, 1961, 1256 pp., page 666 by Rose, Rheingold Publishing Co., New York, N.Y.

ROBERT F. WHITE, *Primary Examiner.*

MORRIS LIEBMAN, ALEXANDER H. BRODMERKEL, *Examiners.*